(12) United States Patent
Otomitsu

(10) Patent No.: US 10,422,964 B2
(45) Date of Patent: Sep. 24, 2019

(54) OPTICAL CONNECTOR WITH OPTICAL FIBERS AND METHOD FOR MANUFACTURING THE SAME

(71) Applicant: FUJIKURA LTD., Tokyo (JP)

(72) Inventor: Takahito Otomitsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/065,713

(22) PCT Filed: Nov. 16, 2016

(86) PCT No.: PCT/JP2016/083881
§ 371 (c)(1),
(2) Date: Jun. 22, 2018

(87) PCT Pub. No.: WO2017/145454
PCT Pub. Date: Aug. 31, 2017

(65) Prior Publication Data
US 2019/0011643 A1      Jan. 10, 2019

(30) Foreign Application Priority Data
Feb. 26, 2016   (JP) ................................. 2016-036387

(51) Int. Cl.
*G02B 6/38* (2006.01)
*G02B 6/36* (2006.01)
*G02B 6/40* (2006.01)

(52) U.S. Cl.
CPC ............. *G02B 6/3861* (2013.01); *G02B 6/36* (2013.01); *G02B 6/40* (2013.01)

(58) Field of Classification Search
None
See application file for complete search history.

(56) References Cited

U.S. PATENT DOCUMENTS

| 4,846,564 A * | 7/1989 | Caron | G02B 6/2835 |
| | | | 385/137 |
| 8,931,964 B2 * | 1/2015 | Lu | G02B 6/3861 |
| | | | 385/84 |

(Continued)

FOREIGN PATENT DOCUMENTS

| JP | S63-262607 A | 10/1988 |
| JP | H03-142408 A | 6/1991 |

(Continued)

OTHER PUBLICATIONS

English Translation of written opinon for PCT/JP2016/083881 / Japan 2016-036387, dated Aug. 29, 2017.*

*Primary Examiner* — Tina M Wong
(74) *Attorney, Agent, or Firm* — Osha Liang LLP

(57) ABSTRACT

An optical connector attached to a plurality of buffered optical fibers each including: a bare optical fiber; and a tube in which the bare optical fiber is inserted in. A multi-fiber optical connector is connected to first ends of the buffered optical fibers, and a plurality of single-fiber optical connectors are respectively connected to second ends of the buffered optical fibers. The multi-fiber optical connector includes: a ferrule fixed to ends of the bare optical fibers; a connector housing that houses the ferrule therein; and a tube fixing portion that fixes the tubes to the connector housing. The buffered optical fiber has a bare fiber fixing portion in which the bare optical fiber and the tube are fixed at a location closer to the ferrule than the tube fixing portion within the multi-fiber optical connector.

6 Claims, 13 Drawing Sheets

(56) References Cited

U.S. PATENT DOCUMENTS

| | | | | |
|---|---|---|---|---|
| 9,239,434 B2* | 1/2016 | Lu | ........................ | G02B 6/3861 |
| 2012/0321257 A1 | 12/2012 | Lu et al. | | |
| 2014/0044397 A1* | 2/2014 | Hikosaka | ................. | G02B 6/38 |
| | | | | 385/81 |
| 2015/0093082 A1* | 4/2015 | Lu | ........................ | G02B 6/3861 |
| | | | | 385/84 |
| 2017/0261716 A1* | 9/2017 | Thompson | ............ | G02B 6/4471 |
| 2018/0120514 A1* | 5/2018 | Ling | ................... | G02B 6/3842 |
| 2019/0011643 A1* | 1/2019 | Otomitsu | ................. | G02B 6/36 |

FOREIGN PATENT DOCUMENTS

| | | |
|---|---|---|
| JP | H04-184305 A | 7/1992 |
| JP | 2002-267881 A | 9/2002 |
| JP | 2003-066273 A | 3/2003 |
| JP | 2006-030287 A | 2/2006 |
| JP | 3835670 B2 | 10/2006 |
| JP | 2007-108796 A | 4/2007 |

* cited by examiner

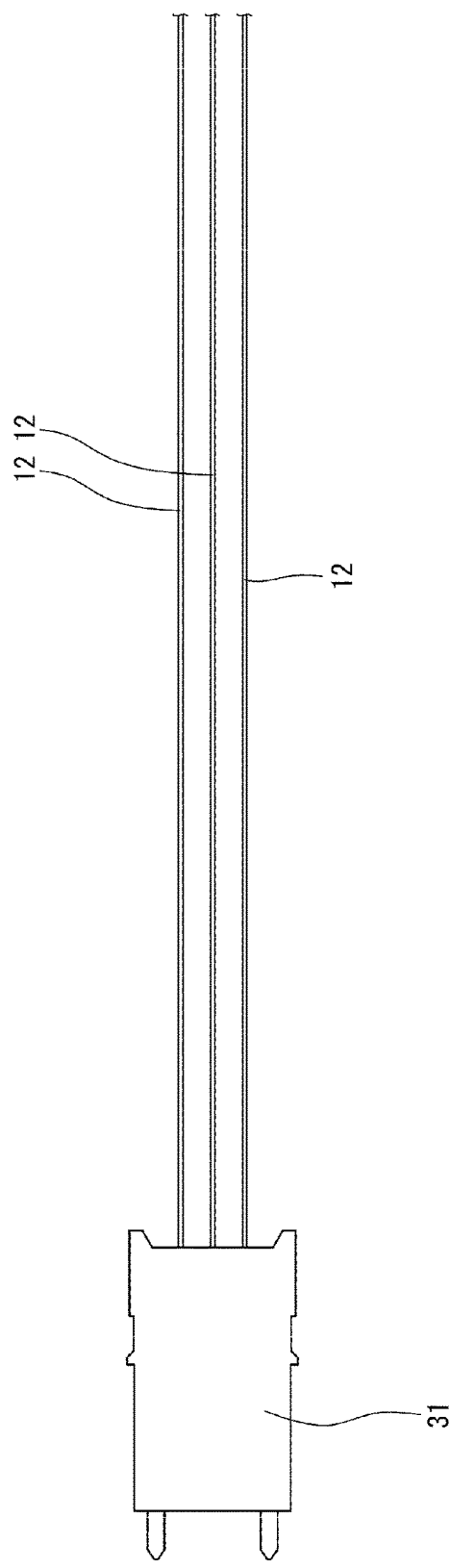

OPTICAL CONNECTOR WITH OPTICAL FIBERS AND METHOD FOR MANUFACTURING THE SAME

TECHNICAL FIELD

The present invention relates to an optical connector with optical fibers and a method of manufacturing the same, and more particularly to an optical connector with optical fibers that includes a multi-fiber optical connector from which a plurality of buffered optical fibers are branched and a method of manufacturing the same.

BACKGROUND

There has heretofore been known an optical connector with optical fibers, what is called a fanout code, in which a plurality of buffered optical fibers are branched from a multi-fiber optical connector while single-fiber optical connectors are respectively connected to ends of the branched buffered optical fibers (see, e.g., Patent Literature 1). FIG. 1 is a diagram schematically showing a structure of a conventional optical connector with optical fibers. As shown in FIG. 1, the conventional optical connector with optical fibers includes a multi-fiber optical connector 510, a plurality of buffered optical fibers 520 branched from the multi-fiber optical connector 510, and single-fiber optical connectors 530 attached to ends of the respective buffered optical fibers 520.

Each of the buffered optical fibers 520 includes a tube 521 and a bare optical fiber 522 housed in the tube 521. Each of those bare optical fibers 522 is housed loosely within the tube 521. Ends of the tube 521 and the bare optical fiber 522 near the single-fiber optical connector 530 are fixed to a ferrule 531 in the single-fiber optical connector 530. Furthermore, ends of the respective tubes 521 near the multi-fiber optical connector 510 are fixed to a connector housing 511 of the multi-fiber optical connector 510. Ends of the respective bare optical fibers 522 near the multi-fiber optical connector 510 are fixed to a ferrule 512 in the multi-fiber optical connector 510.

When an optical connector with optical fibers thus constructed is under a low temperature for an environmental test or the like, the tubes 521 and the bare optical fibers 522 shrink. The tubes 521 are formed of a material that has a higher rate of shrinkage (coefficient of thermal expansion) than the material of the bare optical fibers 522. Therefore, the tubes 521 shrink to a larger extent relative to the bare optical fibers 522. As a result, as shown in FIG. 2, the bare optical fibers 522 relatively project from the tubes 521 into the multi-fiber optical connector 510. Thus, the bare optical fibers 522 are bent within the multi-fiber optical connector 510. If the bare optical fibers 522 are thus bent, the optical characteristics of the bare optical fibers 522 are deteriorated due to the bend loss. When the buffered optical fibers 520 become long in length (e.g., over 50 cm in length), the amount of shrinkage of the tubes 521 increases. Therefore, the deterioration becomes more significant.

PATENT LITERATURE

Patent Literature 1: JP 3835670 B

SUMMARY

One or more embodiments of the present invention provide an optical connector with optical fibers that is unlikely to cause bare optical fibers to be bent within a multi-fiber optical connector and is capable of maintaining good optical characteristics even if it is under a low-temperature environment or buffered optical fibers are pushed into the multi-fiber optical connector.

Furthermore, one or more embodiments of the present invention provide a method of manufacturing an optical connector with optical fibers that can produce such an optical connector with optical fibers by a simple process.

According to one or more embodiments of the present invention, there is provided an optical connector with optical fibers that is unlikely to cause bare optical fibers to be bent within a multi-fiber optical connector and is capable of maintaining good optical characteristics even if it is under a low-temperature environment or buffered optical fibers are pushed into the multi-fiber optical connector. The optical connector with optical fibers has a plurality of buffered optical fibers each including a bare optical fiber and a tube in which the bare optical fiber is loosely inserted, a multi-fiber optical connector connected to first ends of the plurality of buffered optical fibers, and a plurality of single-fiber optical connectors respectively connected to second ends of the plurality of buffered optical fibers. The multi-fiber optical connector includes a ferrule to which the ends of the bare optical fibers of the plurality of buffered optical fibers are fixed, a connector housing that houses the ferrule therein, and a tube fixing portion in which the tubes of the plurality of buffered optical fibers are fixed to the connector housing. Each of the plurality of buffered optical fibers has a bare fiber fixing portion in which the bare optical fiber and the tube are fixed at a location closer to the ferrule than the tube fixing portion within the multi-fiber optical connector.

According to this configuration, in one or more embodiments, tubes of buffered optical fibers are fixed to a tube housing in a tube fixing portion. Therefore, when a multi-fiber optical connector is connected to a mating plug, for example, the buffered optical fibers are prevented from being pushed into the multi-fiber optical connector even if an axial force is applied to the buffered optical fibers. Accordingly, bare optical fibers in the buffered optical fibers are prevented from being bent within the multi-fiber optical connector. Thus, the optical characteristics of the bare optical fibers can be prevented from being deteriorated. Furthermore, the bare optical fiber and the tube of each of the buffered optical fibers are fixed closer to a ferrule than the tube fixing portion by a bare fiber fixing portion. Therefore, even if the optical connector with optical fibers is under a low temperature for an environmental test or the like to cause the tubes to shrink, the bare optical fibers can be prevented from projecting from the bare fiber fixing portion toward the ferrule. Accordingly, the bare optical fibers in the buffered optical fibers are prevented from being bent within the multi-fiber optical connector. Thus, the optical characteristics of the bare optical fibers can be prevented from being deteriorated.

In one or more embodiments, in order to reduce forces applied to the buffered optical fibers at the root of the multi-fiber optical connector, it is preferable to form the tube fixing portion at an end of the connector housing near the single-fiber optical connector. Furthermore, it is preferable to form the bare fiber fixing portion at an end of the tube.

According to one or more embodiments of the present invention, there is provided a method of manufacturing an optical connector with optical fibers that can produce the aforementioned optical connector with optical fibers by a simple process. In this method, a plurality of buffered optical fibers each including a bare optical fiber and a tube in which the bare optical fiber is loosely inserted are prepared. First ends of the bare optical fibers of the plurality of buffered optical fibers are fixed to a ferrule of a multi-fiber optical connector, and a first adhesive material is applied onto each of the bare optical fibers over a predetermined length from a location far away from the ferrule by a predetermined distance. Each of the tubes of the plurality of buffered optical fibers is moved toward the ferrule until an area of the bare optical fibers to which the first adhesive material has been applied is covered with the tube. After each of the tubes has been moved, the first adhesive material is hardened to form a bare fiber fixing portion in which the bare optical fibers and the tubes are fixed. A connector housing of the multi-fiber optical connector is assembled so that the ferrule is housed in the connector housing. A second adhesive material is filled into between the connector housing and the tubes at a location farther away from the ferrule than the bare fiber fixing portion. The second adhesive material filled between the connector housing and the tubes is hardened to form a tube fixing portion in which the tubes of the plurality of buffered optical fibers are fixed to the connector housing. Single-fiber optical connectors are attached to second ends of the plurality of buffered optical fibers, respectively.

With this method, in one or more embodiments, an optical connector with optical fibers that can maintain good optical characteristics as described above can be manufactured by a simple process.

Furthermore, according to one or more embodiments, it is preferable to fix the tubes of the plurality of buffered optical fibers to each other with a third adhesive material before each of the tubes of the plurality of buffered optical fibers is moved toward the ferrule. When a plurality of tubes are thus integrated with each other, those tubes can collectively be moved toward the ferrule and fixed. Accordingly, the manpower required to move and fix a plurality of tubes can be reduced.

According to one or more embodiments of the present invention, tubes of buffered optical fibers are fixed to a tube housing in a tube fixing portion. Therefore, when a multi-fiber optical connector is connected to a mating plug, for example, the buffered optical fibers are prevented from being pushed into the multi-fiber optical connector even if an axial force is applied to the buffered optical fibers. Accordingly, bare optical fibers in the buffered optical fibers are prevented from being bent within the multi-fiber optical connector. Thus, the optical characteristics of the bare optical fibers can be prevented from being deteriorated. Furthermore, the bare optical fiber and the tube of each of the buffered optical fibers are fixed closer to a ferrule than the tube fixing portion by a bare fiber fixing portion. Therefore, even if the optical connector with optical fibers is under a low temperature for an environmental test or the like to cause the tubes to shrink, the bare optical fibers can be prevented from projecting from the bare fiber fixing portion toward the ferrule. Accordingly, the bare optical fibers in the buffered optical fibers are prevented from being bent within the multi-fiber optical connector. Thus, the optical characteristics of the bare optical fibers can be prevented from being deteriorated.

BRIEF DESCRIPTION OF DRAWINGS

FIG. 8A is a cross-sectional view showing a process of manufacturing the optical connector with optical fibers illustrated in FIG. 3.

DETAILED DESCRIPTION

Figure 1:
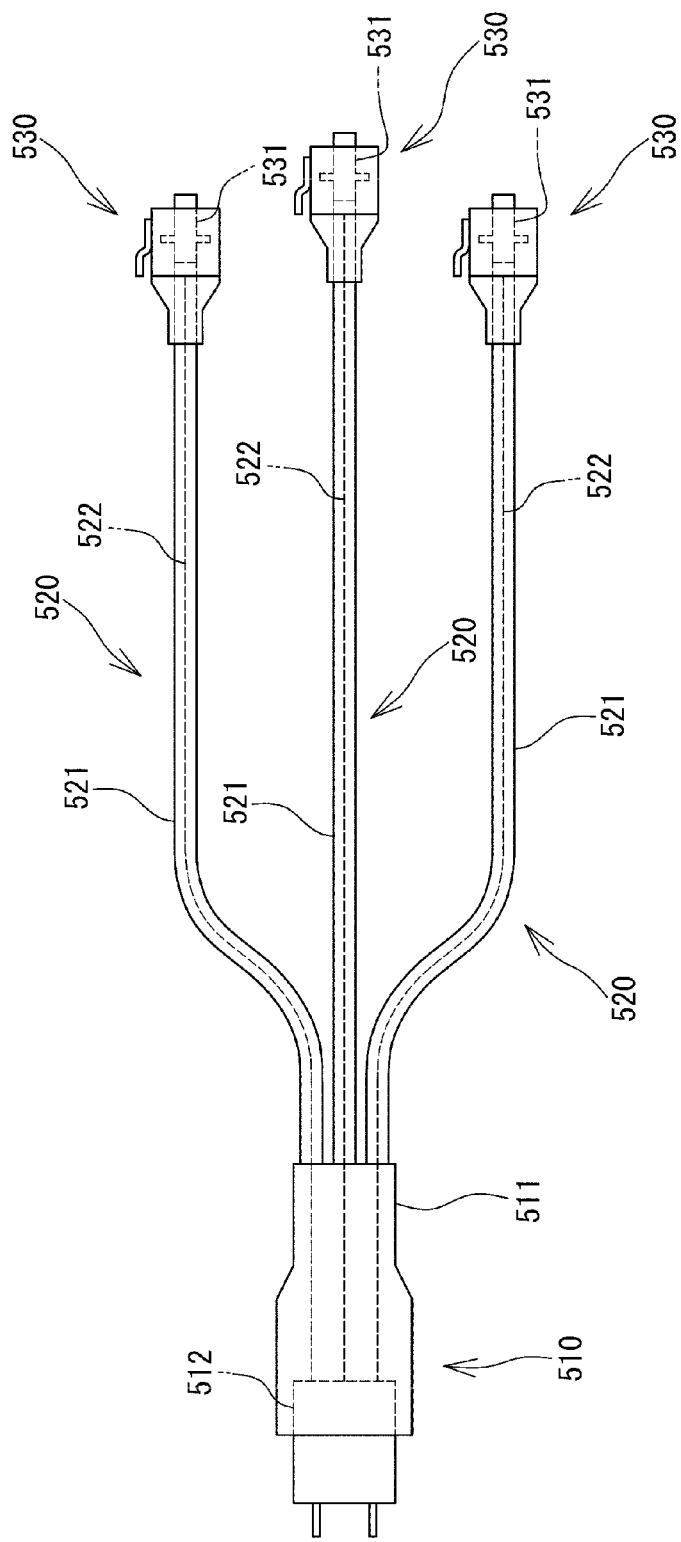
FIG. 1 is a diagram schematically showing a structure of a conventional optical connector with optical fibers.
Figure 2:
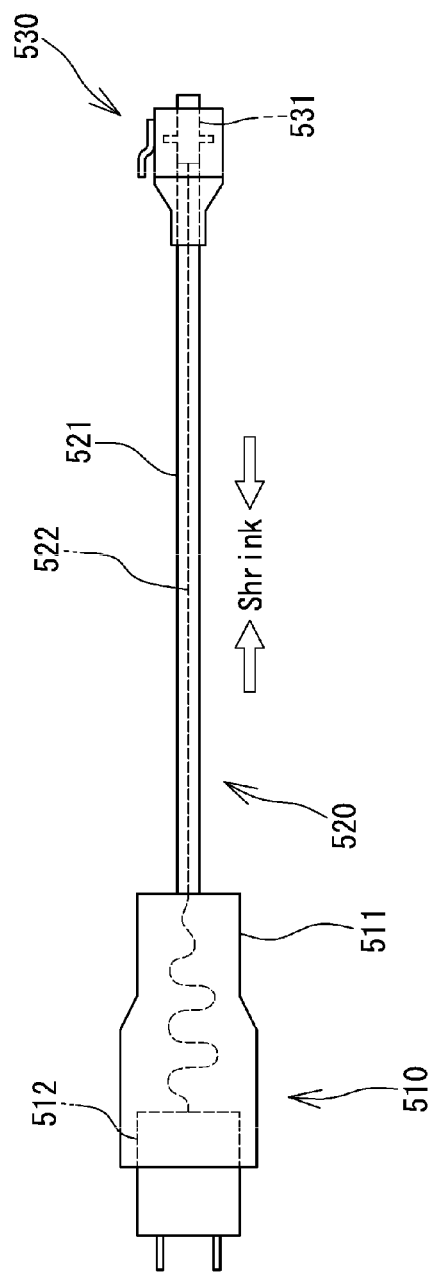
FIG. 2 is a diagram explanatory of the conventional optical connector with optical fibers shown in FIG. 1.

Embodiments of an optical connector with optical fibers according to the embodiments of the present invention will be described below with reference to FIGS. 3 to 8F. In FIGS. 3 to 8F, the same or corresponding components are denoted by the same or corresponding reference numerals and will not be described below repetitively. Furthermore, in FIGS. 3 to 8F, the scales or dimensions of components may be exaggerated, or some components may be omitted.

Figure 3:
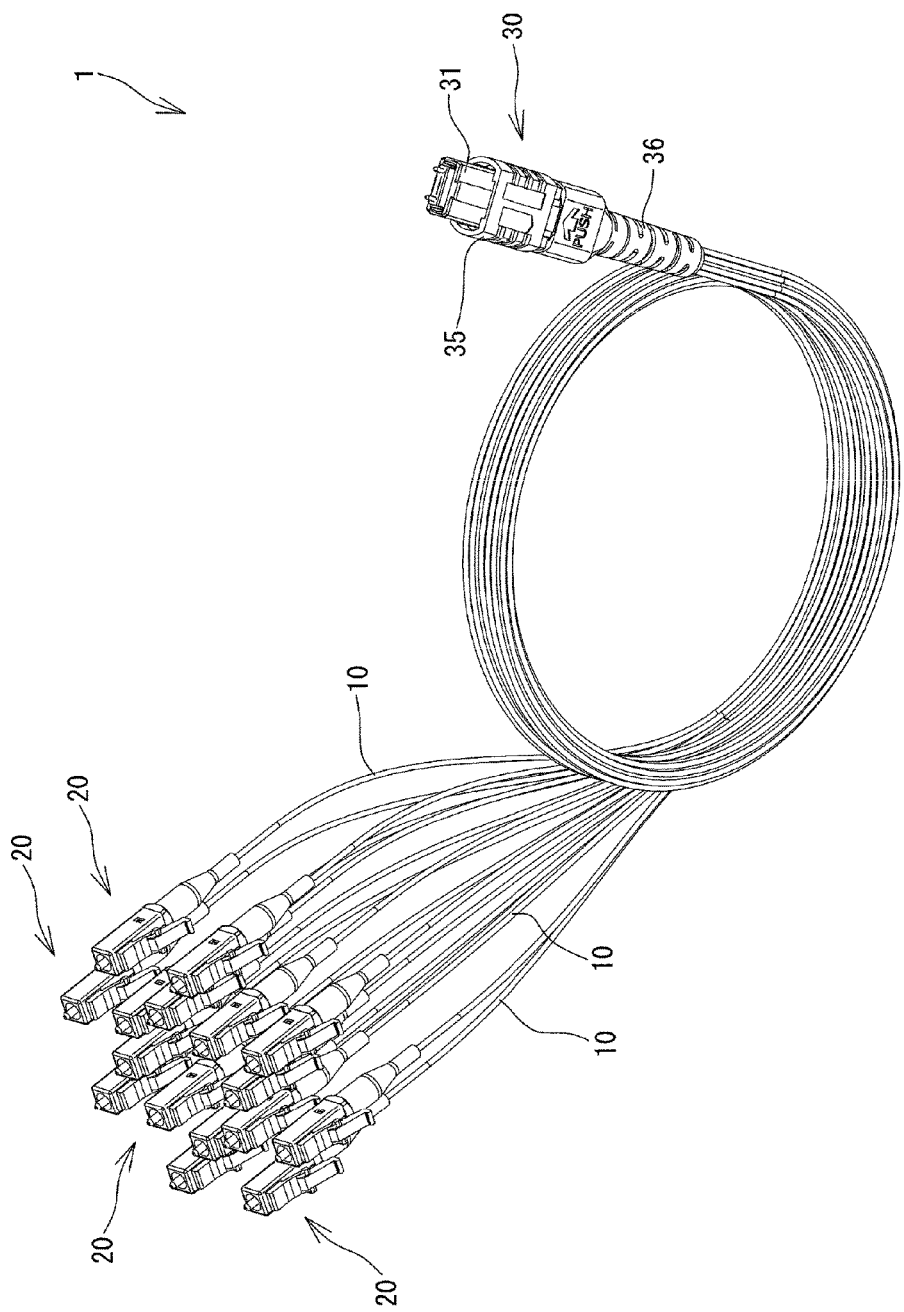
FIG. 3 is a perspective view showing an optical connector with optical fibers according to one or more embodiments of the present invention.

FIG. 3 is a perspective view showing an optical connector with optical fibers 1 according to one or more embodiments of the present invention. As shown in FIG. 3, the optical connector with optical fibers 1 includes a plurality of buffered optical fibers 10, single-fiber optical connectors 20 attached to ends of the respective buffered optical fibers 10, and a multi-fiber optical connector 30 attached to the other ends of the buffered optical fibers 10. The buffered optical fibers 10 are bundled at the root of the multi-fiber optical connector 30 and branched from the multi-fiber optical connector 30 toward the single-fiber optical connectors 20. The optical connector with optical fibers 1 in one or more embodiments includes 16 buffered optical fibers 10. However, the number of the buffered optical fibers 10 is not limited to the illustrated example. Furthermore, the shapes and types of the single-fiber optical connectors 20 and the multi-fiber optical connector 30 are not limited to the illustrated example.

Figure 4:
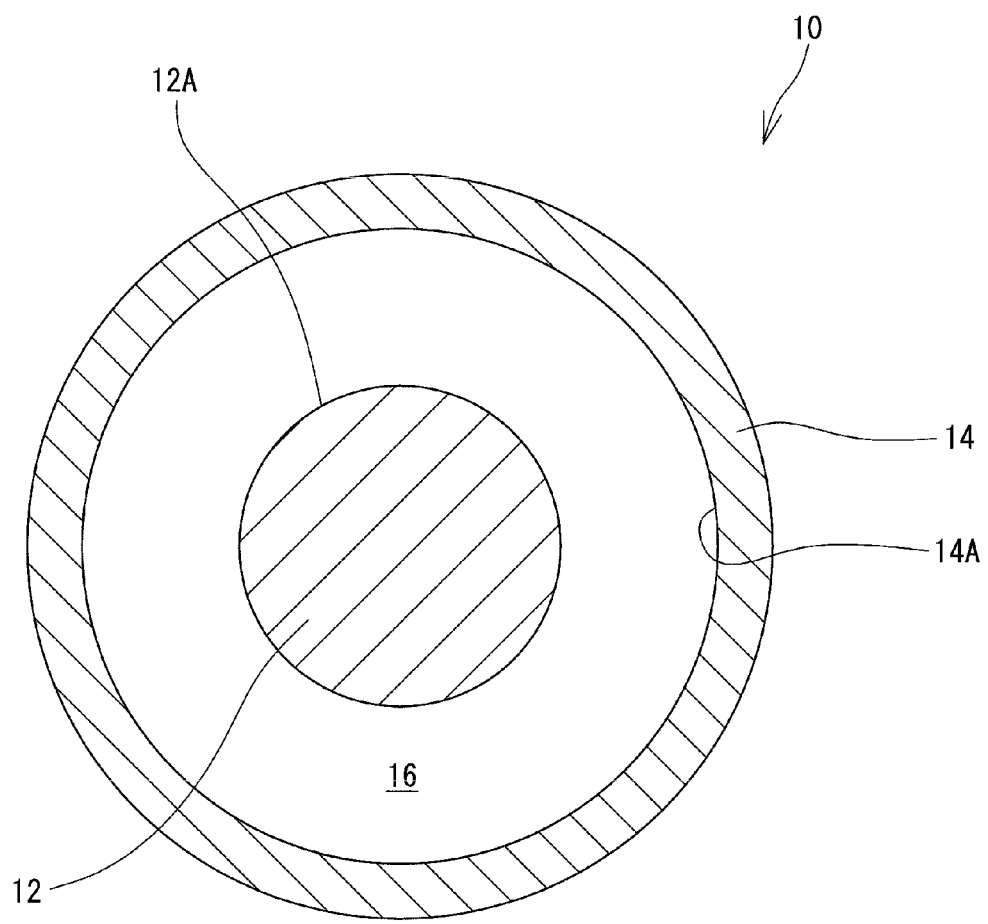
FIG. 4 is a cross-sectional view of a buffered optical fiber of the optical connector with optical fibers illustrated in FIG. 3, taken on a plane perpendicular to an axis of the buffered optical fiber.

FIG. 4 is a cross-sectional view of the buffered optical fiber 10 taken on a plane perpendicular to an axis of the buffered optical fiber 10. As shown in FIG. 4, each of the buffered optical fibers 10 includes a bare optical fiber 12 and a tube 14 that accommodates the bare optical fiber 12 therein. The inside diameter of the tube 14 is greater than the outside diameter of the bare optical fiber 12. Thus, a space 16 is formed between an outer circumferential surface 12A of the bare optical fiber 12 and an inner circumferential surface 14A of the tube 14. In this manner, the bare optical fiber 12 is loosely inserted within the tube 14. Accordingly, the bare optical fiber 12 can be bent or moved within the tube 14. For example, a tube having an outside diameter of about 0.9 mm and an inside diameter of about 0.5 mm may be used for the tube 14, and a bare optical fiber having an outside diameter of 0.25 mm may be used for the bare optical fiber 12.

Figure 5:
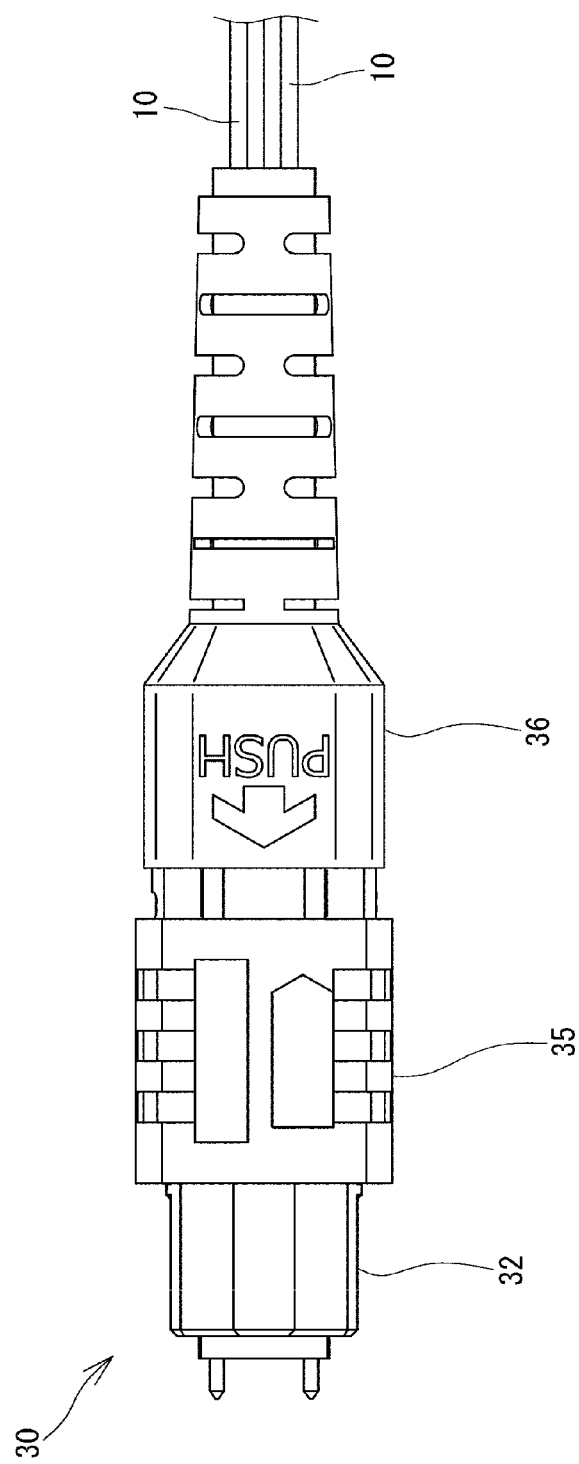
FIG. 5 is a plan view showing a multi-fiber optical connector in the optical connector with optical fibers illustrated in FIG. 3.
Figure 6:
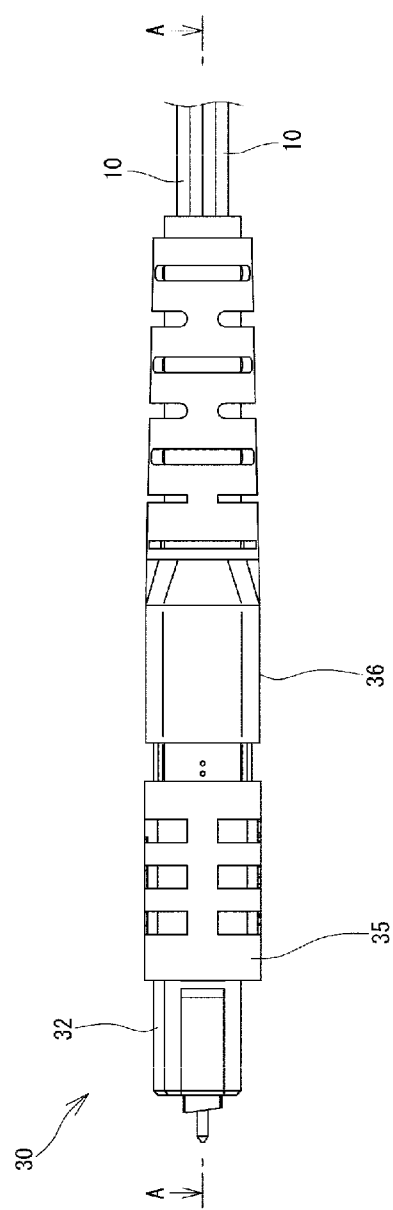
FIG. 6 is a front view of FIG. 5.
Figure 7:
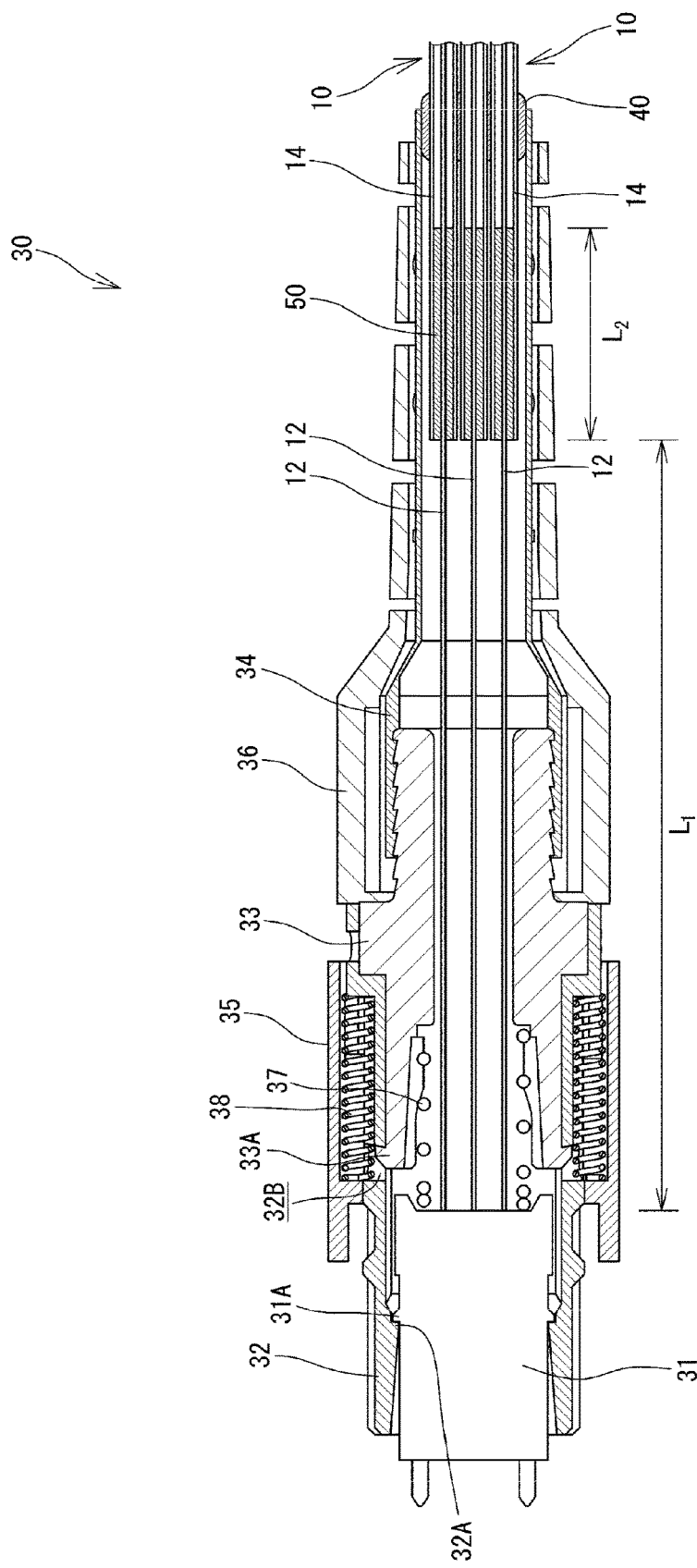
FIG. 7 is a cross-sectional view taken along line A-A of FIG. 6.

FIG. 5 is a plan view showing the multi-fiber optical connector 30, FIG. 6 is a front view thereof, and FIG. 7 is a cross-sectional view taken along line A-A of FIG. 6. As shown in FIGS. 5 to 7, the multi-fiber optical connector 30 includes a ferrule 31 for fixing the bare optical fibers 12 in the buffered optical fibers 10, a front housing 32 that accommodates the ferrule 31 therein, a rear housing 33 that engages with the front housing 32, a tube housing 34 attached to a rear end of the rear housing 33, a coupling 35 that covers a periphery of the front housing 32, and a protective boot 36 that covers a rear end portion of the rear housing 33 and the tube housing 34. For example, the protective boot 36 is formed of an elastic material such as rubber. Thus, the protective boot 36 protects the buffered optical fibers 10 from extreme bending. In FIG. 7, the buffered optical fibers 10 are illustrated as being thinned out for better understanding.

For example, the ferrule 31 is a pin-guided MT ferrule. As shown in FIG. 7, the ferrule 31 has flange portions 31A projecting outward. The flange portions 31A are configured to engage with protrusions 32A of the front housing 32. Furthermore, the rear housing 33 has elastic hooks 33A projecting outward. When the elastic hooks 33A engage with engagement holes 32B formed in the front housing 32, the rear housing 33 is secured to the front housing 32.

A spring 37 is disposed between the front housing 32 and the rear housing 33. The ferrule 31 is biased frontward by this spring 37. Furthermore, springs 38 are disposed between the front housing 32 and the coupling 35. The coupling 35 is biased frontward by those springs 38.

It is preferable to form the tube housing 34 of an elastic material. For example, a heat-shrinkable tube, which is brought into intimate contact with an object due to thermal contraction so as to cover the object, may be used for the tube housing 34. In one or more embodiments, as described above, the front housing 32 and the rear housing 33 engage with each other, and the tube housing 34 is attached to the rear housing 33. Accordingly, the front housing 32, the rear housing 33, and the tube housing 34 may collectively be considered as a connector housing that houses the ferrule 31 therein.

As shown in FIG. 7, the bare optical fibers 12 of the buffered optical fibers 10 extend inside of the tube housing 34, the rear housing 33, and the front housing 32 of the multi-fiber optical connector 30 to the ferrule 31. In one or more embodiments, the tubes 14 of the buffered optical fibers 10 extend to the middle of the tube housing 34. It is preferable to align end faces of those tubes 14 in an axial direction. For example, the tubes 14 are positioned such that the distance $L_1$ from an end face of the ferrule 31 to the end faces of the tubes 14 is 30 mm. This distance $L_1$ is determined in consideration of an allowable bend radius of the multi-fiber optical connector 30.

Furthermore, as shown in FIG. 7, a tube fixing portion 40 to fix the tubes 14 of the buffered optical fibers 10 to the tube housing 34 is formed at a rear end of the connector housing, i.e., at a rear end of the tube housing 34. For example, the tube fixing portion 40 is formed of an adhesive material or the like. Thus, the tubes 14 of the buffered optical fibers 10 are fixed to the tube housing 34 (connector housing) by the tube fixing portion 40. Therefore, when the multi-fiber optical connector 30 is connected to a mating plug, for example, the buffered optical fibers 10 are prevented from being pushed into the multi-fiber optical connector 30 even if an axial force is applied to the buffered optical fibers 10. Accordingly, the bare optical fibers 12 in the buffered optical fibers 10 are prevented from being bent within the multi-fiber optical connector 30. Thus, the optical characteristics of the bare optical fibers 12 can be prevented from being deteriorated.

Furthermore, a bare fiber fixing portion 50 to fix the tubes 14 and the bare optical fibers 12 within those tubes 14 to each other is formed at ends of the tubes 14 that have been aligned within the tube housing 34 as described above. This bare fiber fixing portion 50 is located closer to the ferrule 31 than the aforementioned tube fixing portion 40. For example, the bare fiber fixing portion 50 is formed of an adhesive material or the like. In this manner, the bare optical fiber 12 and the tube 14 of each of the buffered optical fibers 10 are fixed closer to the ferrule 31 than the tube fixing portion 40 by the bare fiber fixing portion 50. Therefore, even if the optical connector with optical fibers 1 is under a low temperature for an environmental test or the like to cause the tubes 14 to shrink, the bare optical fibers 12 can be prevented from projecting from the bare fiber fixing portion 50 toward the ferrule 31. Accordingly, the bare optical fibers 12 in the buffered optical fibers 10 are prevented from being bent within the multi-fiber optical connector 30. Thus, the optical characteristics of the bare optical fibers 12 can be prevented from being deteriorated. In order to attain such advantageous effects, the bare fiber fixing portion 50 may preferably have some length along the axial direction. For example, the length $L_2$ of the bare fiber fixing portion 50 along the axial direction may preferably be greater than or equal to 10 mm.

As shown in FIG. 3, the buffered optical fibers 10 are branched from the multi-fiber optical connector 30, and a single-fiber optical connector 20 is attached to an end of each of the buffered optical fibers 10. Within each of the single-fiber optical connectors 20, the bare optical fiber 12 and the tube 14 of the buffered optical fiber 10 are both fixed to the ferrule (not shown). Any conventional known method may be used to fix the buffered optical fibers 10 to the single-fiber optical connectors 20.

Figure 8B:
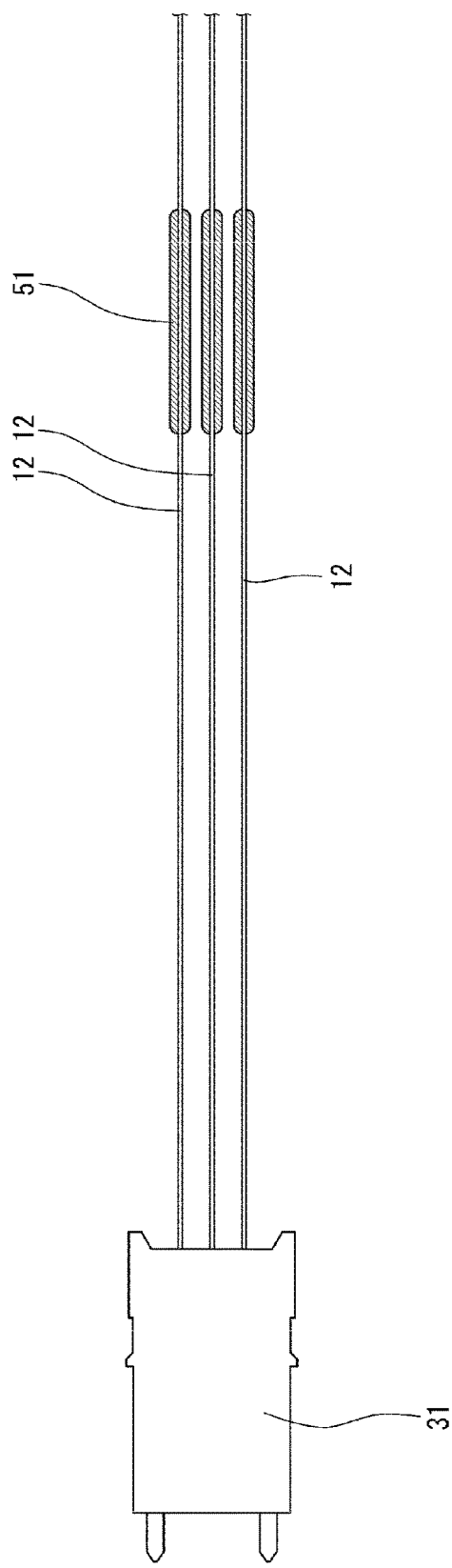
FIG. 8B is a cross-sectional view showing a process of manufacturing the optical connector with optical fibers illustrated in FIG. 3.

Now a method of manufacturing an optical connector with optical fibers thus constructed will be described with reference to FIGS. 8A to 8F. First, as shown in FIG. 8A, a bare optical fiber 12 of each of buffered optical fibers 10 is attached to a ferrule 31 and fixed to the ferrule 31. Next, as shown in FIG. 8B, a first adhesive material 51 is applied onto each of the bare optical fibers 12 over a predetermined length ($L_2$ illustrated in FIG. 7) from a location spaced apart from the ferrule 31 by a certain distance ($L_1$ illustrated in FIG. 7).

Figure 8C:
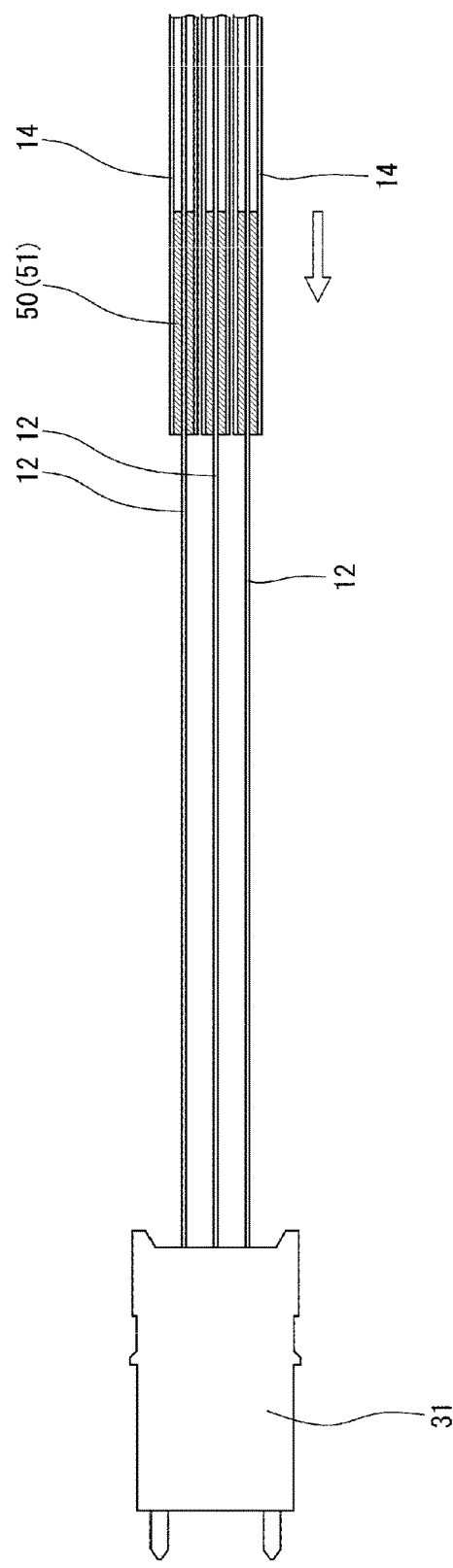
FIG. 8C is a cross-sectional view showing a process of manufacturing the optical connector with optical fibers illustrated in FIG. 3.

Then, as shown in FIG. 8C, the respective tubes 14 of the buffered optical fibers 10 are moved toward the ferrule 31. At that time, the tubes 14 are moved until an area of the bare optical fibers 12 where the first adhesive material has been applied is covered with the tubes 14. As shown in FIG. 8C, it is preferable to position the tubes 14 so that the first adhesive material 51 is filled up to end faces of the tubes 14. After the movement of the tubes 14 has been completed, the first adhesive material 51 is hardened to form a bare fiber fixing portion 50. Thus, the bare optical fibers 12 and the tubes 14 are fixed to each other. For example, an epoxy resin adhesive material such as "High-super 5" sold by Cemedine Co., Ltd. may be used for the first adhesive material 51. It is preferable to use an adhesive material having a high hardness for the first adhesive material 51.

Figure 8D:
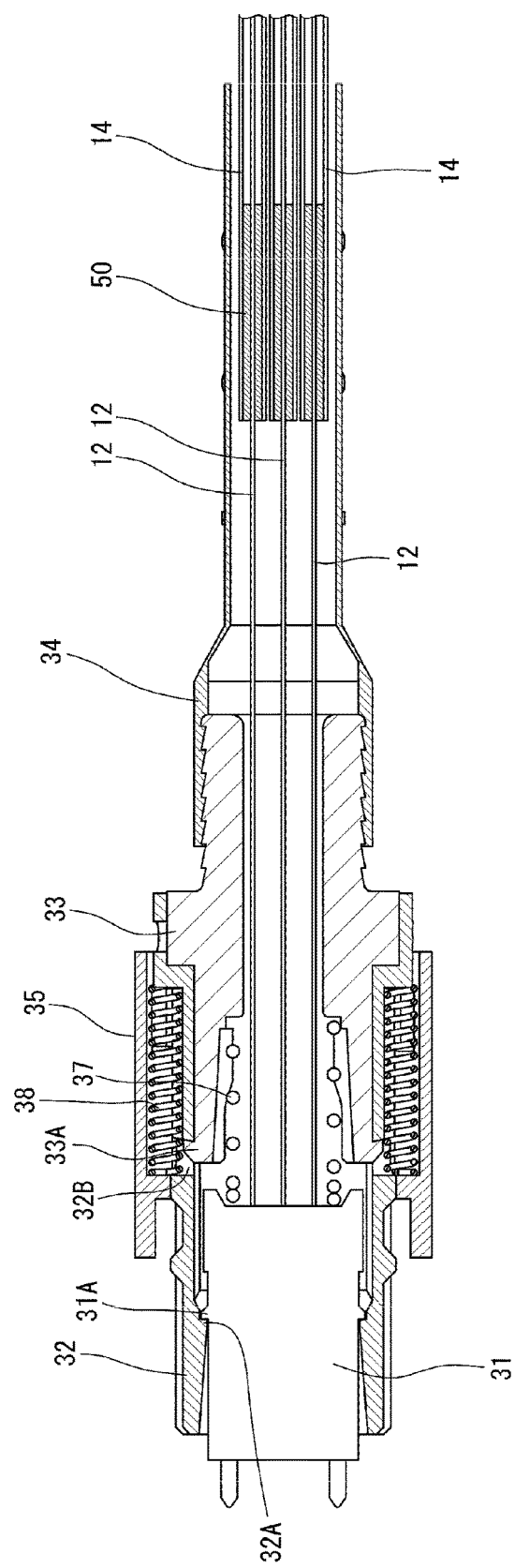
FIG. 8D is a cross-sectional view showing a process of manufacturing the optical connector with optical fibers illustrated in FIG. 3.

Next, as shown in FIG. 8D, a multi-fiber optical connector 30 is assembled. Specifically, a spring 37 and a rear housing 33 of the multi-fiber optical connector 30 are moved toward the ferrule 31, and a front housing 32 is inserted from an opposite side of the ferrule 31 to those components. The ferrule 31, the front housing 32, and the rear housing 33 are incorporated with each other by engagement of the flange portions 31A of the ferrule 31 with the protrusions 32A of the front housing 32 and engagement of the elastic hooks 33A of the rear housing 33 with the engagement holes 32B of the front housing 32. Furthermore, the springs 38 and a coupling 35 are attached around the front housing 32. The tube housing 34 is moved toward the ferrule 31 and attached to an end of the rear housing 33.

Figure 8E:
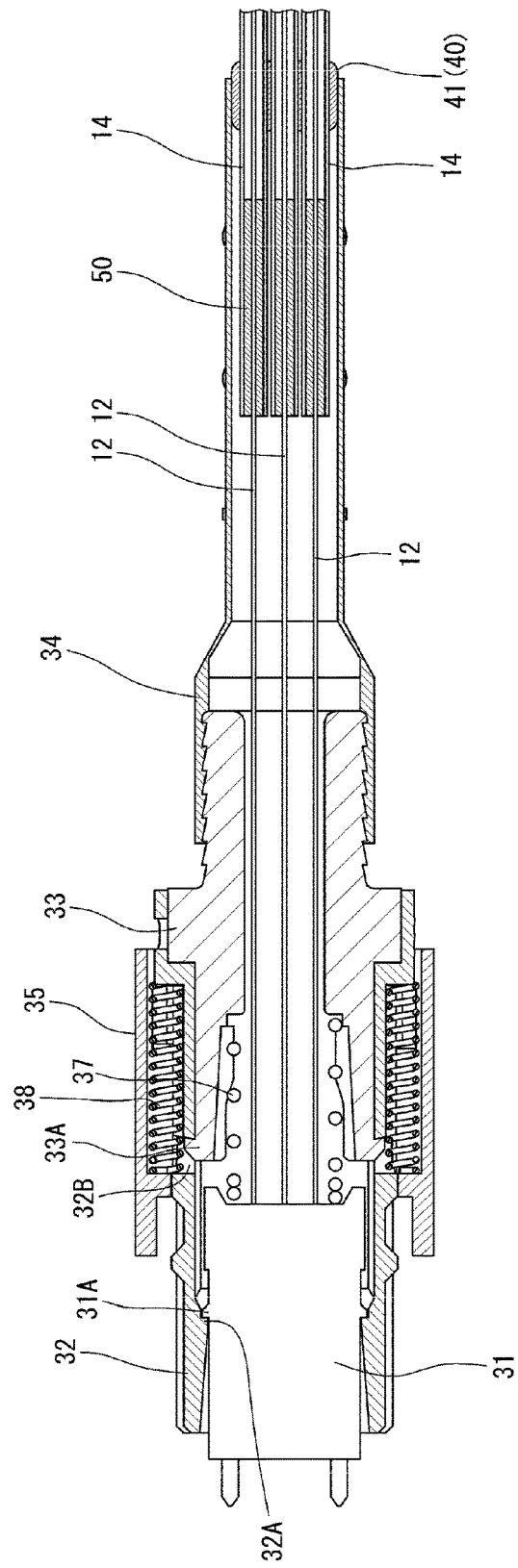
FIG. 8E is a cross-sectional view showing a process of manufacturing the optical connector with optical fibers illustrated in FIG. 3.

Next, as shown in FIG. 8E, a second adhesive material 41 is filled into between an rear end of the tube housing 34 and the tubes 14. The location where the second adhesive material 41 is filled may not be at the rear end of the tube housing 34 but should be farther away from the ferrule 31 than the bare fiber fixing portion 50. It is preferable to fill the second adhesive material 41 into the rear end of the tube housing 34 in order to reduce forces applied to the buffered optical fibers 10 at the root of the multi-fiber optical connector 30.

Thereafter, the second adhesive material 41 is hardened to form a tube fixing portion 40. Thus, the tubes 14 of the buffered optical fibers 10 are fixed to the tube housing 34 (the connector housing). For example, it is preferable to use an adhesive material that is relatively elastic, such as "Super X" sold by Cemedine Co., Ltd., for the second adhesive material 41. If the tube fixing portion 40 is formed of such an elastic adhesive material, the tube fixing portion 40 is also bent when the buffered optical fibers 10 are bent. Accordingly, any deflection is unlikely to be caused within the bare optical fibers 12, and breakage of the bare optical fibers 12 can be prevented.

Figure 8F:
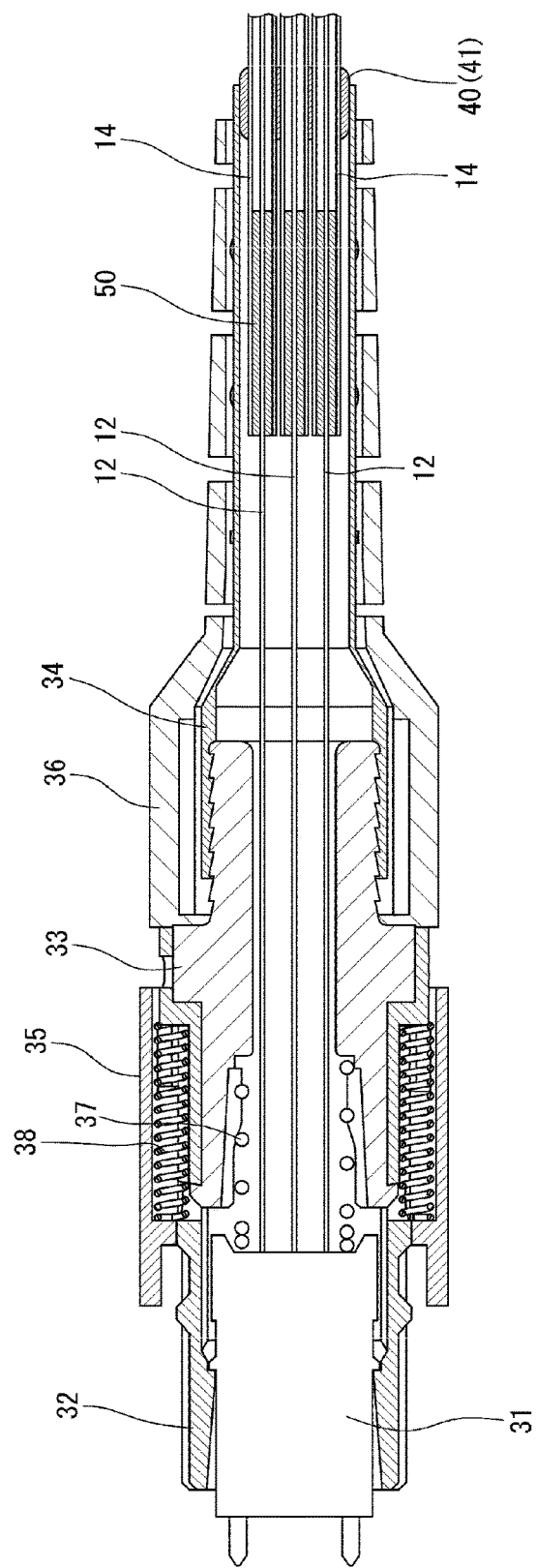
FIG. 8F is a cross-sectional view showing a process of manufacturing the optical connector with optical fibers illustrated in FIG. 3.

Next, as shown in FIG. 8F, a protective boot 36 is moved toward the ferrule 31. The protective boot 36 is attached to a rear end of the rear housing 33 so that the rear ends of the tube housing 34 and the rear housing 33 are covered with the protective boot 36. Then single-fiber optical connectors 20 are respectively attached to the other ends of the buffered optical fibers 10 by using any conventional known method. With the above steps, an optical connector with optical fibers 1 as shown in FIG. 3 is completed.

Before the respective tubes 14 of the buffered optical fibers 10 are moved toward the ferrule 31, ends of the tubes 14 of the buffered optical fibers 10 may be aligned with each other, and, in this state, the tubes 14 may be fixed and integrated with each other by an adhesive material (third adhesive material) or the like. When a plurality of tubes 14 are integrated with each other, those tubes 14 can collectively be moved toward the ferrule 31 and fixed. Accordingly, the manpower required to move and fix a plurality of tubes 14 can be reduced.

INDUSTRIAL APPLICABILITY

One or more embodiments of the present invention is suitably used for an optical connector with optical fibers that includes a multi-fiber optical connector from which a plurality of buffered optical fibers are branched.

DESCRIPTION OF REFERENCE NUMERALS AND SIGNS

1 Optical connector with optical fibers
10 Buffered optical fiber
12 Bare optical fiber
14 Tube
16 Space
20 Single-fiber optical connector
30 Multi-fiber optical connector
31 Ferrule
32 Front housing
33 Rear housing
34 Tube housing
35 Coupling
36 Protective boot
37 Spring
38 Spring
40 Tube fixing portion
41 Second adhesive material
50 Bare fiber fixing portion
51 First adhesive material Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical connector to be attached to a plurality of buffered optical fibers each comprising a tube and a bare optical fiber inserted into the tube, the optical connector comprising:
    a multi-fiber optical connector that connects to first ends of the buffered optical fibers; and
    a plurality of single-fiber optical connectors that each connect to a second end of a respective buffered optical fiber among the plurality of buffered optical fibers,
    wherein the multi-fiber optical connector includes:
        a ferrule that gets fixed to ends of the bare optical fibers;
        a connector housing that houses the ferrule; and
        a tube fixing portion where the tubes are fixed to the connector housing,
    wherein each of the buffered optical fibers comprises a bare fiber fixing portion that fixes the bare optical fiber to the tube at a location closer to the ferrule than the tube fixing portion within the multi-fiber optical connector.

2. The optical connector recited in claim 1, wherein the tube fixing portion is disposed at an end of the connector housing near the single-fiber optical connectors.

3. The optical connector recited in claim 1, wherein each of the bare fiber fixing portions is disposed at an end of a respective tube among the tubes.

4. A method of manufacturing an optical connector with optical fibers, the method comprising:
    preparing a plurality of buffered optical fibers each comprising a tube and a bare optical fiber inserted in the tube;
    fixing first ends of the bare optical fibers to a ferrule of a multi-fiber optical connector;

applying a first adhesive material onto each of the bare optical fibers over a predetermined length of the bare optical fibers from a location away from the ferrule by a predetermined distance;

moving each of the tubes toward the ferrule until an area of the bare optical fibers to which the first adhesive material has been applied is covered with the tube;

after moving each of the tubes, hardening the first adhesive material to form a bare fiber fixing portion that fixes the bare optical fibers to the tubes;

assembling a connector housing of the multi-fiber optical connector that houses the ferrule in the connector housing;

filling a second adhesive material into a space between the connector housing and the tubes at a location farther away from the ferrule than the bare fiber fixing portion;

hardening the second adhesive material to form a tube fixing portion that fixes the tubes to the connector housing; and attaching each of a plurality of single-fiber optical connectors to a second end of a respective buffered optical fiber of the buffered optical fibers.

5. The method recited in claim 4, further comprising fixing the tubes together with a third adhesive material before moving each of the tubes toward the ferrule.

6. The optical connector recited in claim 2, wherein each of the bare fiber fixing portions is disposed at an end of a respective tube from the tubes.

* * * * *